Patented Mar. 13, 1934

1,950,746

UNITED STATES PATENT OFFICE 1,950,746

PRODUCTION OF RESIN-LIKE CONDENSATION PRODUCTS

Fritz Pollak, Vienna, Austria, assignor, by mesne assignments, to Synthetic Plastics Company, Incorporated, New York, N. Y., a corporation of Delaware No Drawing. Application August 7, 1930, Serial No. 473,761. In Austria November 27, 1929

3 Claims. (Cl. 260—3)

My invention refers to the production of resin-like condensation products and more particularly to means whereby these products can be greatly improved and their manufacture can be rendered more reliable than was hitherto possible. The invention is applicable with great advantage to all condensation processes in which organic compounds such as the carbamides, thiocarbamides, dicyandiamide and the like, if acted upon with aldehydes and more especially formaldehyde, are converted into products fit for practical use only if aldehyde in excess is present in the condensing reaction. As is well known to those skilled in the art, the free aldehyde remaining over in the condensation solution exerts an undesirable action in the final process of polymerization or hardening, wherein the condensation products are rendered insoluble and infusible and the products containing such free aldehyde have undesirable properties.

It is an object of my invention to provide means whereby the free aldehyde in excess can be removed from the condensation solution in a regulatable manner, so that the desired percentage of free aldehyde in the solution is obtained.

According to my invention a current of an inert gas or vapor, for instance air, steam or the like, is passed through the solution obtained in a well known manner by condensation of an organic compound of the kind aforesaid with an aldehyde, for instance formaldehyde, in excess of the quantity required for mere condensation, and this treatment is continued until the percentage of free aldehyde in the solution is shown, for instance by analytical methods, to be the desirable minimum at which the solution can still be subjected to the final treatment accompanied by polymerization and hardening without the formation of blisters or bubbles and without premature gelatinization.

Means have already been suggested for removing the free aldehyde in excess of that required during condensation, such excess acting extremely injuriously during the hardening and in the final product. It has for instance been suggested to add to the condensation solution substances capable of combining with or decomposing the free aldehyde. However the products of reaction or decomposition resulting from such addition exert undesirable influences on the final product, and therefore this method of removing the aldehyde in excess has not been adopted in actual practice. If water or other solvents are added to remove these undesirable products of reaction or decomposition, also the initial condensation products which are still soluble are dissolved and washed out also and the highly polymerized constituents of the solution which remain over have a tendency to gelatinize prematurely, so that they are not sufficiently adapted to be cast without the formation of bubbles. The natural endeavour to keep the excess of formaldehyde as low as possible during the condensation process so as to have the desired minimum of formaldehyde in the final hardening process, has not led to practical results either, for experience has shown that it is impossible to obtain in this manner faultless highgrade products, the less so if these products are required to be altogether clear and free from bubbles.

The new process according to the present invention allows separating completely and in a very simple manner the two stages of manufacture requiring a definite contents of formaldehyde. In the condensation stage any desired excess of formaldehyde can now be present and before the second stage is started the free formaldehyde still present in the solution is removed down to the desired minimum without any undesirable changes occurring in the mass. This is obtained by passing air or another neutral inert gas or vapor through the solution in a well regulated manner until the analysis has shown that the desired minimum percentage of free formaldehyde is present in the solution.

The air or other gas blown through the solution, while causing a permanent stirring and increase of surface of the solution, takes up the free aldehyde and carries it away without the mass being otherwise changed. More especially no oxidation of formaldehyde to formic acid occurs during the passage of the air. If the percentage of free formaldehyde is allowed to drop below the desirable minimum, an altogether insoluble product is formed, which cannot be cast any more. Therefore the free aldehyde is removed by blowing down to the percentage which experience has shown to be desirable for the further treatment. To altogether remove the formaldehyde from the solution by blowing air through it has been shown to be impossible. It is therefore probable that all condensation solutions contain a condensation product, from which, if the percentage of aldehyde in the solution is diminished below a certain limit, aldehyde is split off in such manner that during some hours the solution remains constant with respect to the percentage of free aldehyde. At the same time however the solubility of the resin decreases gradually.

The desirable lowest limit of formaldhyde percentage in the solution must be adapted to each individual case, for the new method can be applied to condensation reactions of the most different kind. According to the chemical constitution, temperature etc. of the condensation solution and to the presence of agents accelerating or retardating polymerization, the desirable minimum of free aldehyde must be determined. In the majority of cases a percentage of aldehyde ranging from 0.8–1.6% of the solution is desirable before the final treatment is started.

The invention is particularly important in view of the fact that now there is no need to start condensation with the smallest possible excess of aldehyde. Now the condensation may be started with the most favorable percentage of aldehyde without taking care at this stage of the free aldehyde present in the second stage, as the free aldehyde can be removed in the simplest manner before the second stage is reached. It is now further possible to adjust the condensation solution, no matter in which manner it has been prepared and treated, before starting the second stage, to a precisely predetermined minimum percentage of free aldehyde. This possibility is particularly advantageous, for hitherto the fact was not sufficiently taken into consideration that condensation solutions which appeared to be prepared in a uniform manner and to be treated to obtain the same degree of viscosity, contain a widely varying percentage of free aldehyde, so that hitherto uniform final products could not be obtained at all. By inserting between the condensation stage and the polymerization stage the regulating step according to the present invention, the character of the final product is rendered independent from the condensation, which can now be carried through in any desired manner, the intermediate product nevertheless containing the predetermined percentage of aldehyde. Therefore the new process has proved particularly useful in connection with condensation methods, which hitherto did not lead to practically useful products.

The invention further allows utilizing fully the action exerted by the formaldehyde. In the first condensation stage the formaldehyde acts towards forming the nucleus of the compound to be produced, while later on it acts as a solvent for the resin formed during the reaction. In the last stage it acts not only as a solvent, but also to form the chains for the primary compounds formed in the reaction stage. The new regulating process according to this invention allows reliable regulation of these different functions of the aldehyde.

I am aware that it has already been suggested to act with a current of air on condensation solutions prepared in order to produce resin-like products. However these former suggestions do not include the well defined regulation of the passage of air or the like through the solution at the end of the condensation stage in such manner that the desirable lowest limit to be ascertained by analytical methods of the percentage of free aldehyde is obtained. This well defined treatment with air or the like at a predetermined point of the process and its continuation until a predetermined minimum quantity of free aldehyde is reached, forms the gist of my invention.

The passage of air or some other inert gas or vapor through the solution may take place at any desirable moment after the condensation has come to an end. I may for instance cause the air or the like to pass through the condensation solution while this solution is being subjected to distillation. Obviously in such a case distillation in a current of steam, preferably in vacuo, will prove advantageous.

In order to prevent premature gelatinization, the temperature of the condensation solution is preferably kept so low during the passage of the air, steam or the like, that no substantial progress of polymerization takes place during such passage.

In some cases it has been found advantageous to keep the volume of the condensation solution substantially constant during the passage of air or the like by introducing water or some other solvent.

In the practice of my invention I prefer proceeding for instance as follows:

Example 1

300 grs. urea (carbamide) are heated to boiling in 1500 grs. of a 30% formaldehyde solution acidulated with 5 ccms. of a 10% acetic acid. Into the boiling solution is gradually introduced in the course of one half hour a solution of 300 grs. urea in 500 grs. of a neutral 30% formaldehyde. After some further boiling another 4 ccms. of a 10% acetic acid are added, boiling is continued and the solution is then neutralized.

The percentage of formaldehyde in the solution is now ascertained, for instance in the following manner.

About 0.5 grs. of the condensate are weighed on the scale and this quantity is allowed to stand during one half hour with 50 ccms. of a solution of $NaHSO_3$, the iodine number of which is known. The mixture is then titrated back with a iodine solution having a known percentage of iodine. The difference between the iodine numbers offers the measure for the free formaldehyde in the condensate. In the case of the example above recited, this analysis showed the neutralized solution to contain 2.3% free formaldehyde.

The condensation solution is now heated in the water bath to about 80° C., air being passed through it. The volume of the condensation solution is maintained substantially constant by allowing corresponding quantities of water to flow in. The blowing with air, which is preferably purified, is continued until another analysis shows the percentage of free formaldehyde to have dropped to about 1.5%. The water feed is now shut off and blowing is continued until about 500 grs. water have been blown off, whereupon the condensation solution is subjected to distillation in vacuo at 60° C. Preferably before starting the operation the solution is neutralized and adjusted to the desired percentage of acid. In the present case the neutralized solution is acidulated before distillation with about 6 ccms. of a 10% acetic acid. One might of course also start with the distillation in vacuo directly after the desired percentage of formaldehyde has been attained, without part of the water being first expelled by further blowing. It is also possible to effect the blowing simultaneously with the distillation. The distilled solution is treated further in the usual manner for the production of the desired products.

Example 2

360 grs. urea are dissolved in 1800 grs. of a 30% formaldehyde acidulated with 4 ccms. of a 10% acetic acid. Into this acid solution is allowed to flow in the course of one half hour a solution of monomethylol urea, obtained from 240 grs. urea and 400 grs. formaldehyde. After the entire quantity of this solution has been added, the mixture is heated to boiling during some time, about a further 10 ccms. of a 10% acetic acid being gradually added, whereupon the solution is neutralized. The analysis shows 3.6% free formaldehyde to be present. Air or another inert gas or vapor, for instance steam, is now passed through the solution until the analysis shows the formaldehyde contents to have dropped to about 1.5%. The blowing and further treatment of the solution is effected as described with reference to Example 1. With this solution entirely clear high grade final products are obtained by casting.

Example 3

600 grs. urea are dissolved in 2000 grs. of a 30% neutralized formaldehyde, 2 ccms. of a 10% caustic soda solution and 134 grs. methyl alcohol being added. After blowing for about one half hour about 15 ccms. of a 10% formic acid are added and blowing is continued. The solution is now neutralized and the contents of free formaldehyde amounting to about 2.6% is ascertained by analysis. The blowing and distilling is effected as described with reference to Example 1.

In an analogous manner the new process can be applied also to the production of condensation products from dicyandiamide or other starting materials and aldehydes. Of course the method may also be used to produce mixed condensation products, in short all products of the kind in question, in the preparation of which the aldehyde in excess which is required at the beginning shall be removed before the polymerization stage.

Various changes may be made in the details disclosed in the foregoing specification without departing from the invention or sacrificing the advantages thereof.

I claim:—

1. The method of producing resinous condensation products which comprises reacting a urea material with formaldehyde in an amount in excess of that which will combine with the urea material under acid conditions until a resinous solution is formed, passing an inert gas through such solution at a temperature below the temperature of polymerization for a sufficient period of time to remove substantially all formaldehyde in excess of that necessary to maintain the resin in solution, and then heating to effect polymerization of the resin.

2. The method of producing resinous condensation products which comprises reacting a urea material selected from the group consisting of urea, thiourea and dicyandiamide with formaldehyde in an amount in excess of that which will combine with the urea material under acid conditions until a resinous solution is formed, passing an inert gas through such solution at a temperature below the temperature of polymerization for a sufficient period of time to remove substantially all formaldehyde in excess of that necessary to maintain the resin in solution, and then heating to effect polymerization of the resin.

3. The method of producing resinous condensation products which comprises reacting a urea material with formaldehyde in an amount in excess of that which will combine with the urea material under acid conditions until a resinous solution is formed, passing an inert gas through such solution at a temperature below the temperature of polymerization for a sufficient period of time to remove substantially all formaldehyde in excess of about 0.8–1.6% of formaldehyde, and then heating to effect polymerization of the resin.

FRITZ POLLAK.